UNITED STATES PATENT OFFICE.

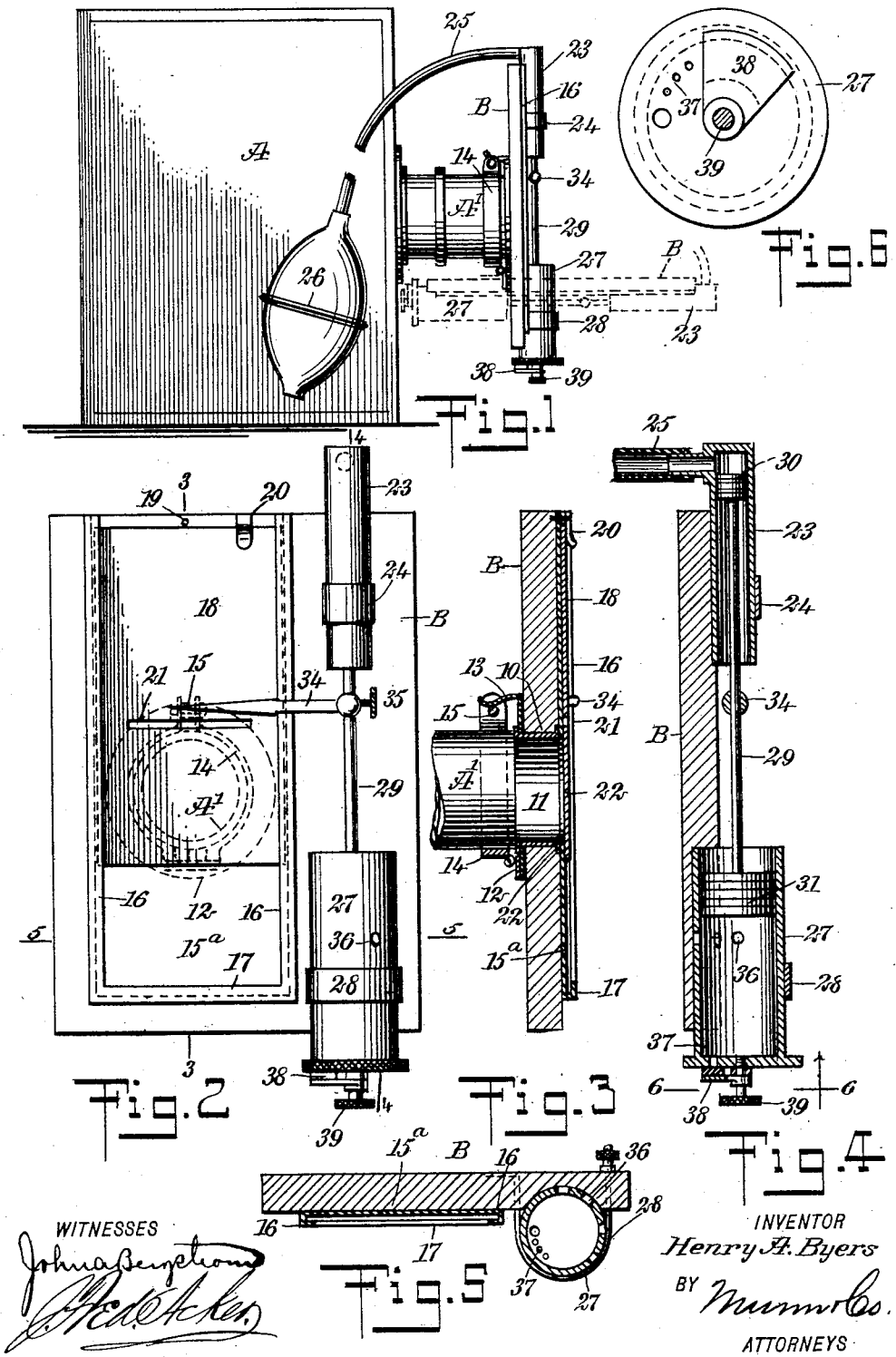

HENRY A. BYERS, OF PE ELL, WASHINGTON, ASSIGNOR OF ONE-HALF TO HARLY E. BYERS, OF PE ELL, WASHINGTON.

PHOTOGRAPHIC SHUTTER.

No. 906,862.  Specification of Letters Patent.  Patented Dec. 15, 1908.

Application filed October 22, 1907. Serial No. 398,537.

*To all whom it may concern:*

Be it known that I, HENRY A. BYERS, a citizen of the United States, and a resident of Pe Ell, in the county of Lewis and State of Washington, have invented a new and Improved Photographic Shutter, of which the following is a full, clear, and exact description.

The purpose of the invention is to improve upon the construction of a photographic shutter, for which Letters Patent were granted to me January 29, 1907, No. 842,522, to the extent that the regulating means employed for varying the relative exposure of the plate, so that the sky portion and foreground will be exposed to the actinic action of the rays of light different lengths of time, will be greatly simplified, and wherein the regulation of the speed, either with reference to a reduced or prolonged exposure of the sky or the foreground, can be quickly and conveniently made, it being also possible to effect a passage of the shutter across the entire lens at uniform speed and in a manner to obtain a very rapid, instantaneous exposure.

It is also a purpose of the invention to simplify the means for attaching the shutter to a lens, providing means whereby the shutter will have not only a hinged connection with the lens, but whereby also the shutter may be revolved relatively to the lens.

Reference is to be had to the accompanying drawings forming a part of this specification, in which similar characters of reference indicate corresponding parts in all the views.

Figure 1 is a side elevation of a camera and an edge view of the improved shutter attached, showing the shutter in working position in full lines, and as folded down for focusing in dotted lines; Fig. 2 is a front elevation of the improvement; Fig. 3 is a longitudinal section taken practically on the line 3—3 of Fig. 2; Fig. 4 is a longitudinal section taken substantially on the line 4—4 of Fig. 2; Fig. 5 is a transverse section, taken practically on the line 5—5 of Fig. 2, and Fig. 6 is an enlarged transverse section, taken substantially on the line 6—6 of Fig. 4.

A represents a camera and A' the lens therefor.

B represents the body of the improved shutter, which is in the form of a board or a plate, as may be desired. The body B of the shutter is provided with an opening 10 therein, adapted to register with the lens A', and in this opening 10 a metal ferrule 11 is fitted, and on the rear end portion of the said ferrule 11 a disk 12 is eccentrically mounted in such a manner that the said disk can turn upon the said ferrule. At the upper annular portion of the disk 12, a spring keeper 13 is located, that extends rearwardly therefrom, and at the lower or wider portion of the disk 12 a clip 14 is hinged to drop downward, and the said clip is in the form of a split ring, the ends whereof at the top are connected by a suitable screw bolt 15, so that when the clip 14 is passed around the lens tube, the clip can be fastened thereon by tightening up the screw 15, and when the board B is in close engagement with the lens tube, the keeper 13 engages the bolt 15 and holds said board in said position, and at the same time the board may be revolved relatively to the lens, and when it is desired to focus, it is simply necessary to drop the board downward on its hinge, as is illustrated in dotted lines in Fig. 1.

A slide-way 15ª in the form of a flat, smooth plate, is secured upon the front of the board B, crossing that portion wherein the opening 10 is produced, and said slide-way 15ª is provided with inwardly-extending side flanges 16 and a bottom flange 17. These flanges are spaced from the said slide-way a sufficient distance to receive a slide 18, the flanges 16 serving as guides for the slide 18, and the flange 17 as a lower stop, and the upward movement of the slide 18 is limited by a pin 19, shown best in Fig. 2, and the slide is held normally in its upper position by a spring keeper 20, also located at the top portion of the shutter. The slide 18 is provided with a transverse exposure slit 21, that crosses the field of the lens when the slide is dropped. The slide-way 15ª is provided with an opening 22 that registers with the opening 10 in the body plate or board B. At one side of the slide-way 15ª also upon the front of the body plate or board, a cylinder 23 is vertically located, being held in position by a strap 24 or its equivalent, and this cylinder is closed at the top and open at the bottom, and at its top portion is provided with means for attachment to a tube 25, provided with a bulb 26 at its outer end, as is shown in Fig. 1. Below the upper cylinder 23 and spaced therefrom, a cylinder 27 of larger diameter is also vertically located on the front face of the body board or plate B. This lower cylinder 27 is held preferably in position by means of a strap 28, and the said cylinder 27 is adapted to turn in the said strap so that openings therein for the admission of air and to be hereinafter particularly referred to, may by a rotation of the cylinder be opened or closed as occasion may demand to control the speed of the shutter. The cylinder 27 is open at the top and a single piston rod 29 is employed for both of the cylinders 23 and 27, being provided with a head 30 at its upper end, to enter the upper cylinder 23, and a larger head 31 at its bottom end that travels in the lower cylinder 27. The slide 18 is moved up and down by the movement of the piston rod 29 and to that end an arm 34 is secured to the said piston rod at its outer end, either being rigidly attached to the said piston rod or adjustably secured thereto by means of a set screw 35, as is illustrated in Fig. 2, and the inner end of the arm 34 is secured, in any approved manner, to the slide 18, preferably at a point above the exposure slit 21.

The lower and larger cylinder 27 is provided with a series of circumferentially arranged apertures 36 located between its ends, preferably about centrally, as illustrated in Figs. 2 and 4, and in the bottom of the cylinder 27 another series of apertures 37 is produced, and these apertures preferably consist, as is illustrated in Fig. 3, of one large aperture and a group, for example, three smaller apertures, and the apertures 37 in the bottom of the cylinder 27 may be opened entirely or partially, or entirely closed by means of a button 38 or the equivalent thereof, pivotally mounted upon the bottom of the said cylinder, usually by means of a set screw 39, as is particularly shown in Figs. 2 and 4.

In regulating the speed of the shutter in the exposure of the sky, the initial movement of the shutter will be slowest when the cylinder 27 is turned to cover up all of the apertures 36, and will be increased in rapidity proportionately to the number of apertures uncovered. The same is true with relation to the turning movement of the shutter to expose the foreground, such latter movement being slowest when all of the appertures 37 are closed, and proportionately faster according to the number of apertures uncovered or the extent to which they may be opened. When the apertures 36 are closed and the larger aperture of the series 37 is opened, the movement of the slide across the lens will be uniform throughout, and a rapid, instantaneous exposure will be obtained.

It is evident that with the means of regulation shown and described any desired combination of speed may be obtained, and that the shutter can be adapted to all conditions of use.

Having thus described my invention, I claim as new and desire to secure by Letters Patent:

1. In photographic shutters, a drop slide, a support therefor, and means secured directly to said slide for imparting a rapid initial movement and a slow terminal movement, and a retarded initial movement and terminal movement.

2. In photographic shutters, a slide, a support therefor, comprising cylinders, a piston rod in both cylinders and provided with a head for each one of said cylinders, one of said cylinders having apertures therein at a point between its ends, and means for opening and closing the apertures.

3. In photographic shutters, a slide, a support therefor, opposing cylinders, a piston rod in both cylinders, and provided with a head for each one of said cylinders, one of said cylinders being provided with a series of apertures between its ends and a series of apertures in its bottom portion, and means for independently opening and closing each series of apertures.

4. In photographic shutters, the combination with a body board or plate and a slide mounted on the said body board or plate, of an upper and a lower cylinder, the lower cylinder being larger than the upper cylinder and provided with a series of apertures between its ends and a series of apertures of different diameters in its bottom portion, means for rotatably supporting the lower cylinder, a movable cover for the apertures in the bottom of the said lower cylinder, and a piston rod common to both of the cylinders, being provided with a head for each.

5. In photographic shutters, a clamp adapted to fit around a lens tube, which clamp has rotary and hinged connection with the shutter.

6. In photographic shutters, the combination with a shutter, of a plate mounted to revolve around the exposure opening of the shutter, a clamp for a lens tube hinged to the said plate, and locking means for the clamp.

7. In photographic shutters, a drop slide, a cylinder having openings therein, means for opening and closing the openings, a piston in the cylinder, an arm carried by the piston rod and connected with the slide, and an air forcing device for operating the piston.

8. In photographic shutters, a drop slide, a support, a cylinder having openings therein and mounted to turn on said support so as to open and close the openings therein, a piston in the cylinder, an arm secured to the piston rod and drop slide, a second cylinder above the first one and into which the piston rod projects and is provided with a piston, and an air bulb connected with the upper end of the said second cylinder.

In testimony whereof I have signed my name to this specification in the presence of two subscribing witnesses.

HENRY A. BYERS.

Witnesses:
FRED G. WELLER,
OLIVER SAGE.